United States Patent
Lee et al.

(10) Patent No.: US 10,721,758 B2
(45) Date of Patent: Jul. 21, 2020

(54) METHOD FOR TRANSMITTING DATA IN A COMMUNICATION SYSTEM AND DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/084,936

(22) PCT Filed: Mar. 23, 2017

(86) PCT No.: PCT/KR2017/003105
§ 371 (c)(1),
(2) Date: Sep. 13, 2018

(87) PCT Pub. No.: WO2017/164657
PCT Pub. Date: Sep. 28, 2017

(65) Prior Publication Data
US 2019/0059097 A1 Feb. 21, 2019

Related U.S. Application Data

(60) Provisional application No. 62/312,456, filed on Mar. 23, 2016.

(51) Int. Cl.
*H04W 72/12* (2009.01)
(52) U.S. Cl.
CPC ....... *H04W 72/1268* (2013.01); *H04W 72/12* (2013.01); *H04W 72/1289* (2013.01)
(58) Field of Classification Search
None
See application file for complete search history.

(56) References Cited

U.S. PATENT DOCUMENTS 7,701,921 B2 * 4/2010 Cho .................. H04W 72/1289
370/349
7,948,936 B2 * 5/2011 Lohr ....................... H04L 47/10
370/329

(Continued)

FOREIGN PATENT DOCUMENTS

KR 1020140121050 10/2014

OTHER PUBLICATIONS

PCT International Application No. PCT/KR2017/003105, Written Opinion of the International Searching Authority dated Jun. 28, 2017, 7 pages.

(Continued)

*Primary Examiner* — Eunsook Choi
(74) *Attorney, Agent, or Firm* — Lee, Hong, Degerman, Kang & Waimey

(57) ABSTRACT

The present invention relates to a wireless communication system. More specifically, the present invention relates to a method and a device for transmitting data in a wireless communication system. According to an aspect of the present invention, the method comprising: receiving, from a network node, uplink scheduling information with an indicator indicating a network node associated with the uplink scheduling information, identifying the network node indicated by the indicator, wherein the identified network node supports at least one service, generating a data unit including data of the at least one service supported by the identified network node, and transmitting, to the network node, the generated data unit via a radio resource indicated by the uplink scheduling information.

9 Claims, 12 Drawing Sheets

(56) References Cited

U.S. PATENT DOCUMENTS

| | | | | |
|---|---|---|---|---|
| 9,363,797 | B2* | 6/2016 | Freda | H04W 72/0406 |
| 10,404,428 | B2* | 9/2019 | Yamada | H04L 5/0053 |
| 2009/0196174 | A1* | 8/2009 | Ji | H04L 1/0025 |
| | | | | 370/230.1 |
| 2009/0196203 | A1* | 8/2009 | Taira | H04B 7/0617 |
| | | | | 370/280 |
| 2011/0206027 | A1 | 8/2011 | Hart et al. | |
| 2012/0300752 | A1* | 11/2012 | Kwon | H04W 56/0005 |
| | | | | 370/336 |
| 2013/0163543 | A1* | 6/2013 | Freda | H04W 72/0406 |
| | | | | 370/329 |
| 2016/0037579 | A1* | 2/2016 | Jung | H04W 24/04 |
| | | | | 370/252 |
| 2016/0119826 | A1* | 4/2016 | Huh | H04W 36/0044 |
| | | | | 370/332 |
| 2016/0337067 | A1* | 11/2016 | Yokomakura | H04B 7/00 |
| 2018/0242304 | A1* | 8/2018 | Rong | H04W 28/0247 |
| 2019/0037409 | A1* | 1/2019 | Wang | H04W 16/04 |

OTHER PUBLICATIONS

Navid, N. et al., "Network Store: Exploring slicing in future 5G networks", Mobility in the Evolving Internet Architecture, Sep. 2015, 7 pages.

NGMN Alliance: "Description of Network Slicing Concept", NGMN 5G P1 Requirements & Architecture Work Stream End-to-End Architecture, Jan. 2016, 7 pages.

3rd Generation Partnership Project (3GPP), "Technical Specification Group Radio Access Network; Evolved Universal Terrestrial Radio Access (E-UTRA); Medium Access Control (MAC) protocol specification (Release 13)," 3GPP TS 36.321 V13.0.0, Dec. 2015, 83 pages.

* cited by examiner

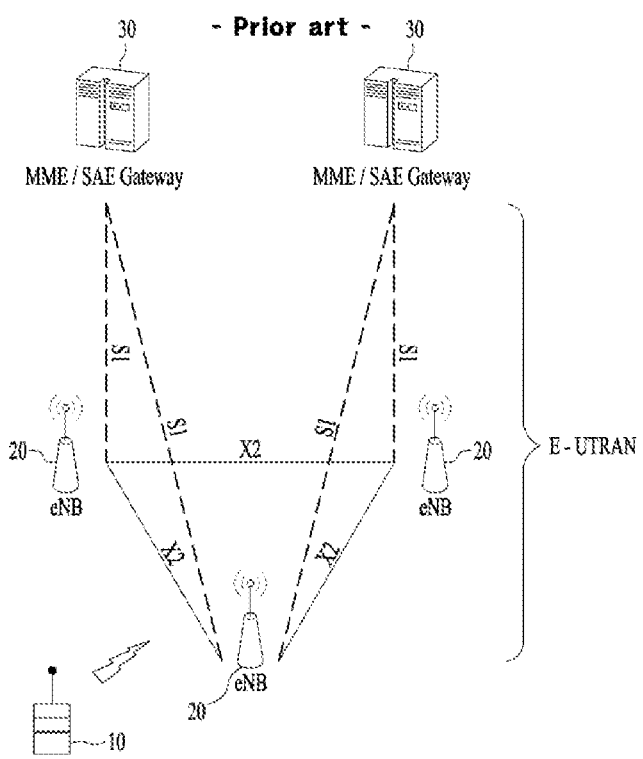

(a) Control-Plane Protocol Stack (b) User-Plane Protocol Stack

METHOD FOR TRANSMITTING DATA IN A COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2017/003105, filed on Mar. 23, 2017, which claims the benefit of U.S. Provisional Application No. 62/312,456, filed on Mar. 23, 2016, the contents of which are all hereby incorporated by reference herein in their entirety.

TECHNICAL FIELD

The present invention relates to a wireless communication system and, more particularly, to a method for transmitting data in a wireless communication system.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

Based on the above-mentioned discussion, methods for transmitting data in a wireless communication system and apparatuses therefor shall be proposed in the following description.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, a method for a user equipment (UE) operating in a wireless communication system, the method comprising: receiving, from a network node, uplink scheduling information with an indicator indicating a network node associated with the uplink scheduling information; identifying the network node indicated by the indicator, wherein the identified network node supports at least one service; generating a data unit including data of the at least one service supported by the identified network node; and transmitting, to the network node, the generated data unit via a radio resource indicated by the uplink scheduling information.

In accordance with another aspect of the present invention, A User Equipment (UE) for operating in a wireless communication system, the UE comprising: a Radio Frequency (RF) module; and a processor operably coupled with the RF module, wherein the processor is configured to: control the RF module to receive, from a network node, uplink scheduling information with an indicator indicating a network node associated with the uplink scheduling information, identify the network node indicated by the indicator, wherein the identified network node supports a least one service, generate a data unit including data of the at least one service supported by the identified network node, and control the RF module to transmit, to the network node, the generated data unit via a radio resource indicated by the uplink scheduling information.

In accordance with another aspect of the present invention, a method for a network node operating in a wireless communication system, the method comprising: transmitting, to a UE, uplink scheduling information with an indicator indicating the network node associated with the uplink scheduling information; receiving data unit via a radio resource indicated by the uplink scheduling information; checking whether the received data unit is transmitted by the UE; if the received data unit is transmitted by the UE, performing decoding procedure for the received data unit; and if the received data unit is not transmitted by the UE, discarding the received data unit.

Preferably, the UE is connected to at least one network node which do not use different radio resources exclusively, and wherein each of the at least one network node supports at least one service.

Preferably, the UE is aware of the at least one service supported by each of the at least one network node.

Preferably, the indicator is included in the uplink scheduling information itself, or in a control signal for the uplink scheduling information.

Preferably, the data unit is further included service identifiers of the at least one service of which data are included in the data unit, or an UE identifier.

It is to be understood that both the foregoing general description and the following detailed description of the present invention are exemplary and explanatory and are intended to provide further explanation of the invention as claimed.

Advantageous Effects

According to the present invention, the UE can transmit data of the service supported by the network node.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 2A is a block diagram illustrating network structure of an evolved universal mobile telecommunication system (E-UMTS)

MODE FOR INVENTION

Figure 1:
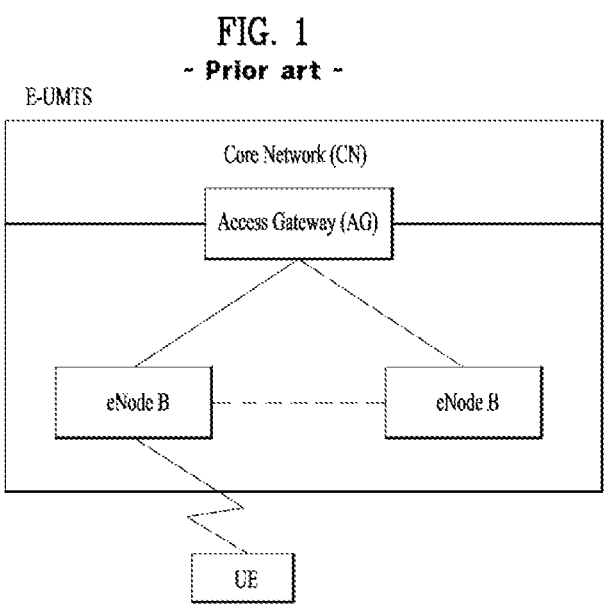
FIG. 1 is a diagram showing a network structure of an Evolved Universal Mobile Telecommunications System (E-UMTS) as an example of a wireless communication system.

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
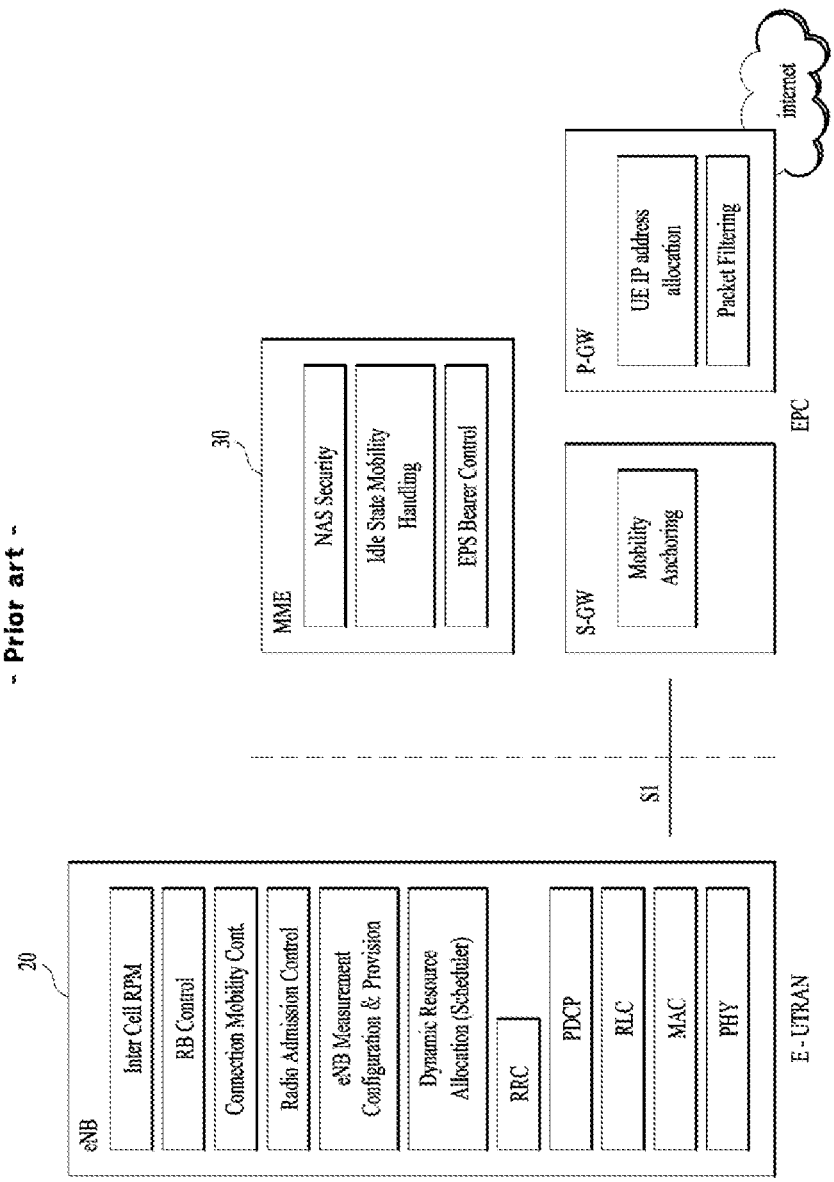
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
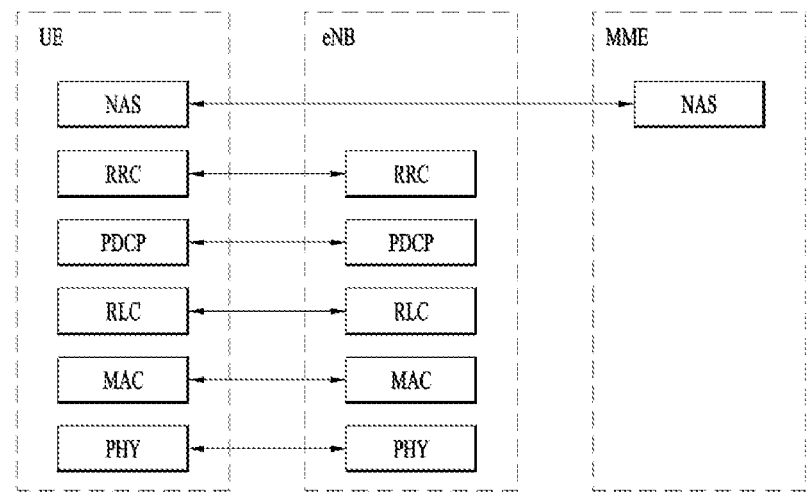
FIG. 3 is a diagram showing a control plane and a user plane of a radio interface protocol between a UE and an E-UTRAN based on a 3rd generation partnership project (3GPP) radio access network standard.
Figure 3:
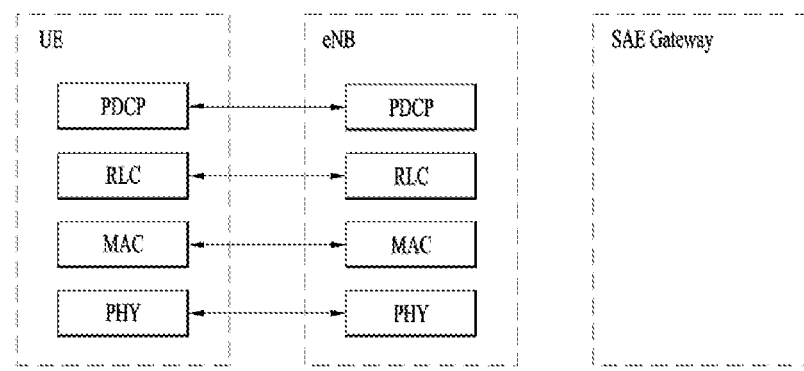

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
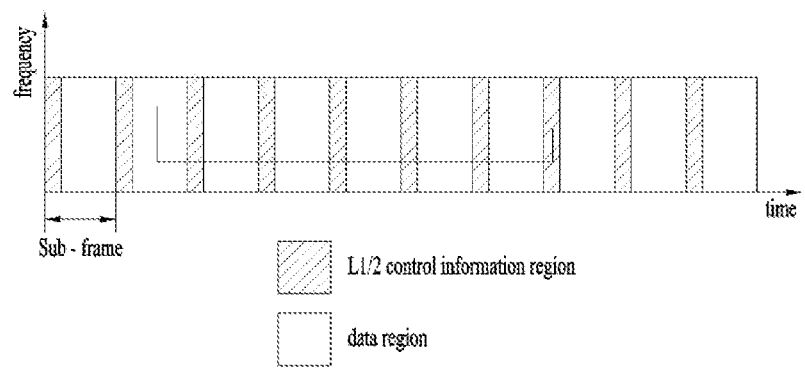
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
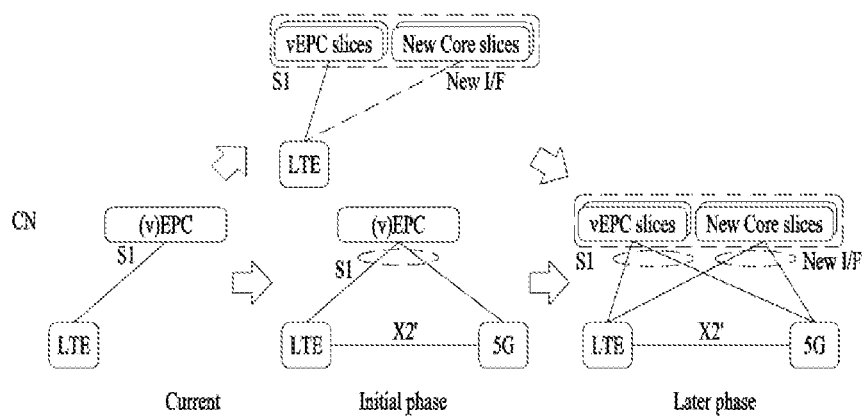
FIG. 5 is a diagram showing a migration scenario towards next generation RAT.

FIG. 5 is a diagram showing a migration scenario towards next generation radio access technologies (RAT). FIG. 5 illustrates an example of migration scenarios from LTE towards next generation Radio access network/Core Network (RAN/CN). It can be assumed that nation-wide coverage has already been provided by LTE, a likely scenario is to start to introduce a new technology utilizing the existing infrastructure as much as possible. For instance, an operator starts to deploy a new (5G) RAT in a limited area where capacity increase is required to accommodate the large amount of traffic. If the new RAT can be connected to the existing EPC via the existing S1 interface, an operator can launch the new RAT service earlier with lower cost compared to deploying a full-fledged system. Likewise, if an operator wants to provide a new service with new CN (e.g., slicing technology), it is also beneficial to utilize the nation-wide coverage already provided by LTE. This can be achieved if the new CN can connect to the eNB (possibly by a new interface). After these initial deployments, an operator may want to deploy the rest of components for the next generation RAN/CN based on the timing to meet market demands. To support these migration scenarios, it is essential that RAN and CN can be evolved independently. For this, RAN-Core connectivity, Virtualization & Network Slicing may be discussed. It is worth to take this viewpoint into account for the subsequent technology study. For an operator to migrate from LTE towards next generation RAN/CN smoothly, it is essential that RAN and CN can be evolved independently.

In LTE New Radio (NR) technology for 5G, RAN architecture shall allow for the operation of Network Slicing. In addition, RAN architecture shall support tight interworking between LTE and LTE NR by use of dual connectivity (DC) between LTE and LTE NR. Network slicing means that network functions and resources are provided as a set depending on network characteristics required by Service(s). In order to support this, RAN functions also needs to be provided as a set by considering Network Slice Instance. Thus, RAN slicing mechanism needs to be invented.

Figure 6:
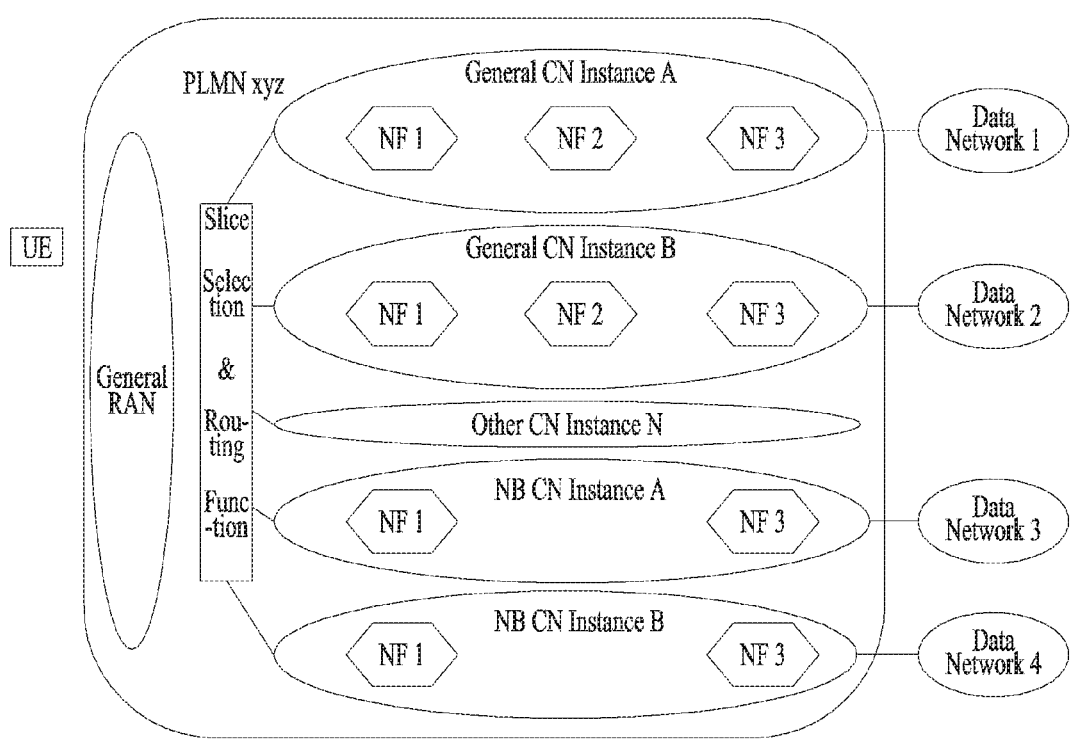
FIG. 6 is a diagram explaining a network slicing without slicing the radio according to an embodiment.

FIG. 6 is a diagram explaining a network slicing without slicing the radio according to an embodiment. Referring to FIG. 6, network slicing enables the operator to create networks customized to provide optimized solutions for different market scenarios which demand diverse requirements, e.g. in the areas of functionality, performance and isolation.

Network Slice (NS) is composed of (i) all the Network Functions (NFs) that are required to provide the required Telecommunication Services and Network Capabilities, and (ii) the resources to run these NFs. In this specification, a Network Slice may be equivalent to a Network Slice Instance. The Public Land Mobile Network (PLMN) may consist of one or more network slices. The special case of just one Network Slice is equivalent to an operator's single, common, general-purpose network, which serves all UEs and provides all Telecommunication Services and Network Capabilities that the operator wants to offer.

Network Function (NF) may be a processing function in a network, which has defined functional behavior and defined interfaces. An NF can be implemented either as a network element on a dedicated hardware, or as a software instance running on a dedicated hardware, or as a virtualized function instantiated on an appropriate platform, e.g. on a cloud infrastructure.

Network Capability is a network provided and 3GPP specified feature that typically is not used as a separate or standalone "end user service", but rather as a component that may be combined into a service that is offered to an "end user". For example, a Location Service is typically not used by an "end user" to simply query the location of another UE. As a feature or network capability, it might be used e.g. by a tracking application, which is then offered as the "end user service". Network Capabilities may be used network internally and/or can be exposed to external users, which are also denoted as a 3rd parties.

In this embodiment, it may be assumed that any slicing of a PLMN is not visible to the UEs at the radio interface. So in this case, a slice routing and selection function is needed to link the radio access bearer(s) of a UE with the appropriate core network instance. This embodiment may be comparable to what is introduced with the DECOR feature. This embodiment doesn't make any assumption on any potential RAN internal slicing. The main characteristics is that the RAN appears as one RAT+PLMN to the UE and any association with network instance is performed network internally, without the network slices being visible to the UE.

The slice selection and routing function may be provided by the RAN, e.g. like today's NAS Node Selection Function. Alternatively, a CN provided function may perform that task. The slice selection and routing function routes signaling to the CN instance based on UE provided and possible CN provided information.

As all network instances of the PLMN share radio access, there is a need for separating access barrings and (over)load controls per slice. That may be accomplished comparable to today's separated access barring and (over)load control that is provided per PLMN operator for network sharing. In this embodiment, there may be CN resources that cannot be fully separated, e.g. transport network resources.

Figure 7:
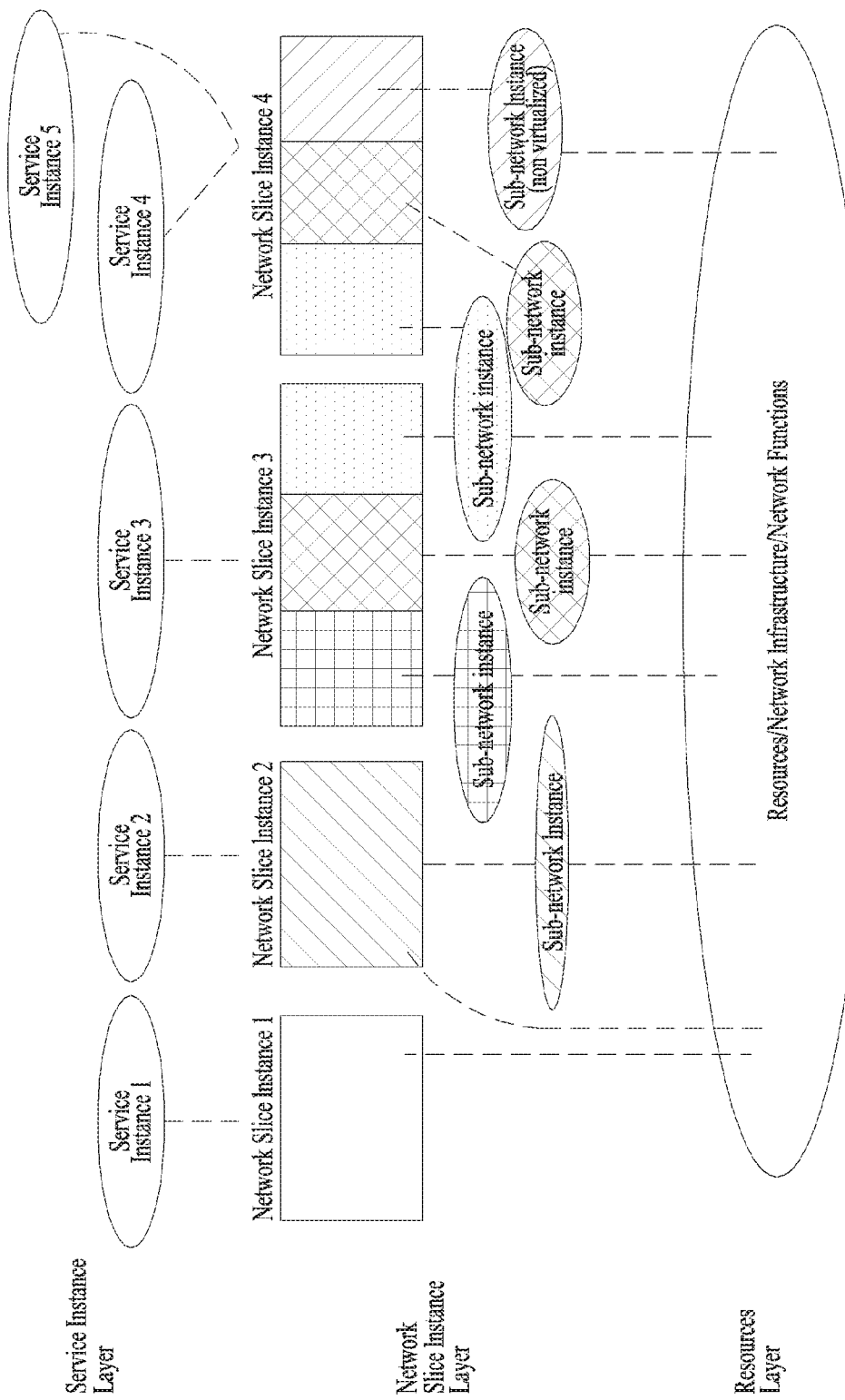
FIG. 7 is a diagram showing a network slicing conceptual outline.

FIG. 7 is a diagram showing a network slicing conceptual outline. As depicted in FIG. 7, the network slicing concept consists of 3 layers: 1) Service Instance Layer, 2) Network Slice Instance Layer, and 3) Resource layer.

The Service Instance Layer represents the services (end-user service or business services) which are to be supported. Each service is represented by a Service Instance. Typically services can be provided by the network operator or by 3rd parties. In line with this, a Service Instance can either represent an operator service or a 3rd party provided service.

A network operator uses a Network Slice Blueprint to create a Network Slice Instance. A Network Slice Instance provides the network characteristics which are required by a Service Instance. A Network Slice Instance may also be shared across multiple Service Instances provided by the network operator.

The Network Slice Instance may be composed by none, one or more Sub-network Instances, which may be shared by another Network Slice Instance. Similarly, the Sub-network Blueprint is used to create a Sub-network Instance to form a set of Network Functions, which run on the physical/logical resources.

In the present specification, the following terms can be defined as follows.

Service Instance may be defined as an instance of an end-user service or a business service that is realized within or by a Network Slice.

Network Slice Instance may be defined a set of network functions, and resources to run these network functions, forming a complete instantiated logical network to meet certain network characteristics required by the Service Instance(s). A network slice instance may be fully or partly, logically and/or physically, isolated from another network slice instance. The resources comprise of physical and logical resources. A Network Slice Instance may be composed of Sub-network Instances, which as a special case may be shared by multiple network slice instances. The Network Slice Instance is defined by a Network Slice Blueprint. Instance-specific policies and configurations are required when creating a Network Slice Instance. Network characteristics examples are ultra-low-latency, ultra-reliability etc.

Network Slice Blueprint may be defined as a complete description of the structure, configuration and the plans/work flows for how to instantiate and control the Network Slice Instance during its life cycle. A Network Slice Blueprint enables the instantiation of a Network Slice, which provides certain network characteristics (e.g. ultra-low latency, ultra-reliability, value-added services for enterprises, etc.). A Network Slice Blueprint refers to required physical and logical resources and/or to Sub-network Blueprint(s).

Sub-network Instance may be defined as A Sub-network Instance comprises of a set of Network Functions and the resources for these Network Functions. The Sub-network Instance is defined by a Sub-network Blueprint. A Sub-network Instance is not required to form a complete logical network. A Sub-network Instance may be shared by two or more Network Slices. The resources comprises of physical and logical resources.

Sub-network Blueprint may be defined as a description of the structure (and contained components) and configuration of the Sub-network Instances and the plans/work flows for how to instantiate it. A Sub-network Blueprint refers to Physical and logical resources and may refer to other Sub-network Blueprints.

Physical resource may be defined as a physical asset for computation, storage or transport including radio access. Network Functions are not regarded as Resources.

Logical Resource may be defined as Partition of a physical resource, or grouping of multiple physical resources dedicated to a Network Function or shared between a set of Network Functions.

Network Function (NF) may be defined as Network Function refers to processing functions in a network. This includes but is not limited to telecom nodes functionality, as well as switching functions e.g. Ethernet switching function, IP routing functions. VNF is a virtualized version of a NF (refer to ETSI NFV for further details on VNF).

Figure 8:
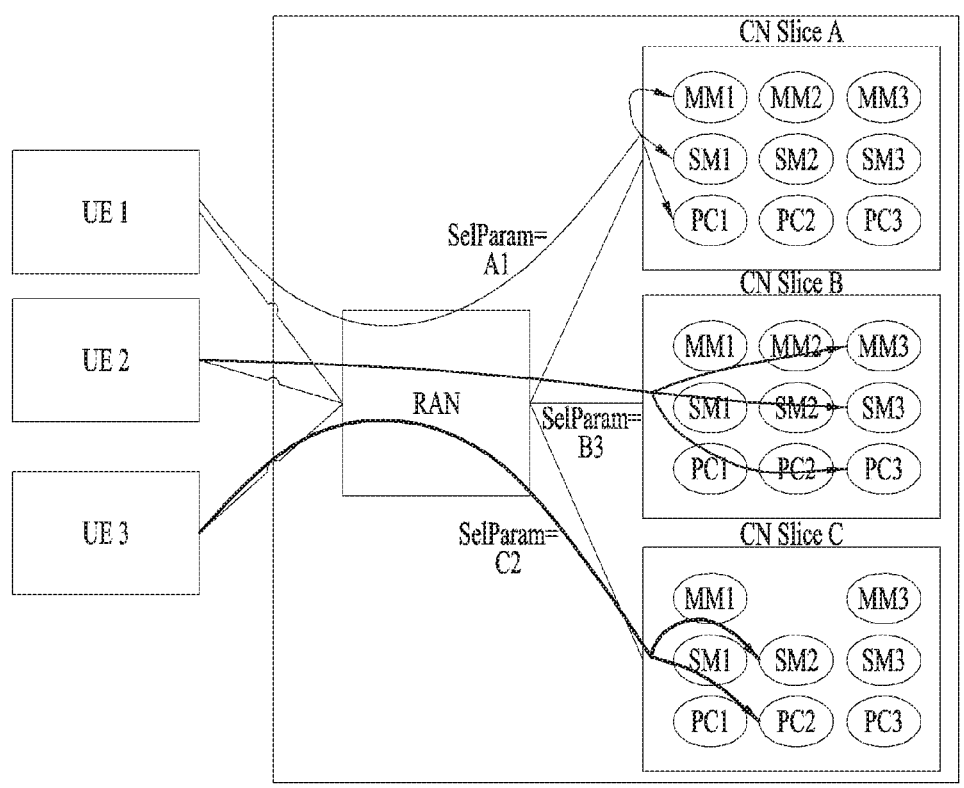
FIG. 8 is a diagram explaining a network Slice Selection according to an embodiment.

FIG. 8 is a diagram explaining a network Slice Selection according to an embodiment. As another embodiment, network Slice Selection may be considered to support network slicing. This embodiment proposes that a multi-dimensional descriptor (e.g. application, service descriptor) is configured in the UE. UE reports multi-dimensional descriptor to the network. Based on this multi-dimensional descriptor provided by the UE and on other information (e.g. subscription) available in the network, the relevant functions within a certain network slice can be selected. For this embodiment, it should be possible to steer the UE to different network slice depending on the type of application and service it requires. This may depend on factors such as UE capabilities, configuration and authorization. In order to perform network selection, the selection principle should enable selection of the appropriate function to deliver a certain service even within a class of functions designed for a certain use case.

In other word, selection criteria should enable selection of right network slice for a certain application and also the right functional components within the network slice for a certain service requested by the UE at any time. FIG. 8 shows that the application running in the UE can provide a multi-dimensional descriptor. The multi-dimensional descriptor may contain at least the following: (i) Application ID, (ii) Service Descriptor (e.g. eMBB service, CriC, mMTC).

The network can use the multi-dimensional descriptor along with other information (e.g. subscription) available in the network to choose the appropriate network slice and network functions. This is referred to as the multi-dimensional selection mechanism. Following are the possible options for network slice and function selection:

Two-step selection mechanism: Along with information (e.g. subscription) available in the network, selection function in the RAN uses the application ID (part of the multi-dimensional descriptor) to select the appropriate core network slice and selection function within the core network uses the service descriptor (part of the multi-dimensional descriptor) selects the appropriate network functions within the network slice.

One-step selection mechanism: Along with information (e.g. subscription) available in the network, selection function within the RAN or the selection function in the core network uses the application ID and Service Descriptor (multi-dimensional descriptor) to select the appropriate network slice, network functions and (re-)directs the UE accordingly.

Figure 9:
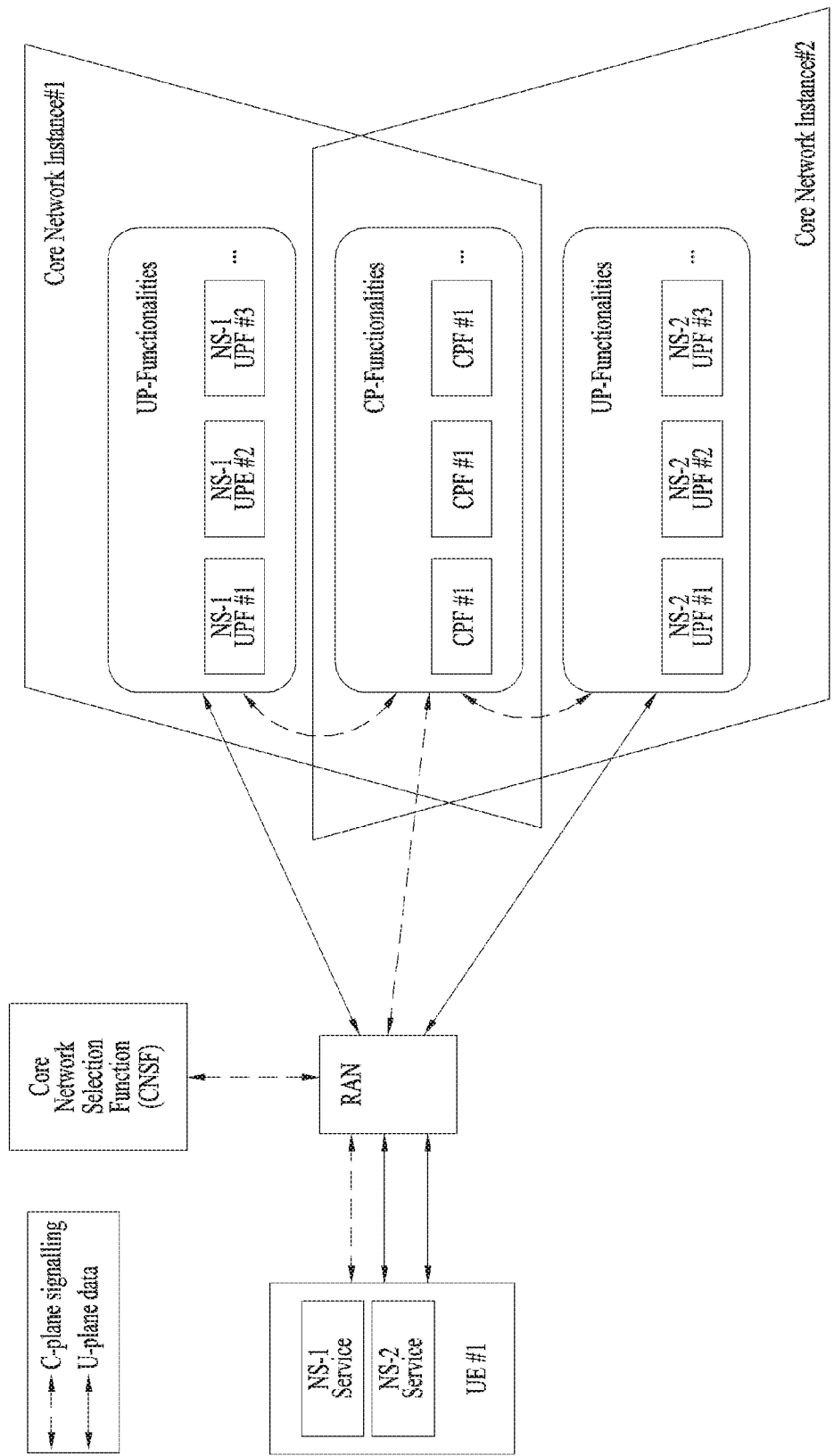
FIG. 9 is a diagram showing a sharing a set of C-plane functions of one core network Instance to accommodate multiple sets of U-plane functions of multiples core network instances.

FIG. 9 is a diagram showing a sharing a set of C-plane functions of one core network Instance to accommodate multiple sets of U-plane functions of multiples core network instances. As depicted in FIG. 9, to enable a UE to simultaneously obtain services from multiple Network Slices of one network operator, a single set of C-Plane Functions is shared across multiple Core Network Instances.

Referring to FIG. 9, a Core Network Instance may consist of a single set of C-Plane Functions and a single set of U-Plane Functions. A Core Network Instance may be dedicated for the UEs that are belonging to the same UE type. Identifying the UE type is done by using a specific parameter, e.g., the UE Usage Type, and/or information from the UE's subscription. A set of C-Plane functions is responsible, for example, for supporting UE mobility if demanded or for admitting the UE into the network by performing authentication and subscription verification. A set of U-Plane Functions in a Core Network Instance is responsible for providing a specific service to the UE and for transports the U-Plane data of the specific service. For example, one set of U-Plane functions in Core Network Instance #1 provides an enhanced mobile broadband service to the UE, whereas another set of U-Plane functions in Core Network Instance #2 provides a critical communication service to the UE. When a UE first connects to the operator's Network, a default Core Network Instance that matches to the UE Usage Type may be assigned to the UE. Each UE can have multiple U-Plane connections to different sets of U-Plane Function that are available at different Core Network Instances simultaneously. The Core Network Selection Function (CNSF) is responsible for (i) Selecting which Core Network Instance to accommodate the UE by taking into account the UE's subscription and the specific parameter, e.g., the UE Usage Type, (ii) Selecting which C-Plane Functions within the selected Core Network Instance that the Base Station should communicate with. This selection of C-Plane Functions is done by using the specific parameter, e.g., UE Usage Type, and (iii) Selecting which set of U-Plane Functions that the Base Station should establish the connection for transport U-Plane data of different services. This selection of U-plane Function is done by using the specific parameter, e.g., UE Usage Type and the Service Type.

In LTE New Radio (NR) technology for 5G, RAN architecture is required to allow for the operation of Network Slicing. In addition, RAN architecture is required to support tight interworking between LTE and LTE NR by use of dual connectivity (DC) between LTE and LTE NR.

Network Slicing means that network functions and resources are provided as a set depending on the network characteristics required by the Service. In order to support this, RAN functions also needs to be provided as a set by considering Network Slice Instance. In this case, the UE may connect to multiple network nodes each of which supports different services.

In prior art, multiple network nodes, i.e., eNBs, support same services and use exclusively different radio resources so that the UE does not need to take care of which eNB schedules the UE. In other words, when the UE receives an UL grant, the UE generates a MAC PDU as a result of the Logical Channel Prioritization (LCP) procedure and send it. At this, the UE may perform the LCP procedure for all data of the UE regardless of the service or network node.

However, if the UE connects to multiple network nodes supporting different services (e.g., due to network slicing), it may be difficult for the network node to use different radio resources exclusively. In this case, the UE needs to be aware from which network node the UL grant is received. Accordingly, the UE may generate a MAC PDU by only considering the data from services which is supported by the network node.

Figure 10:
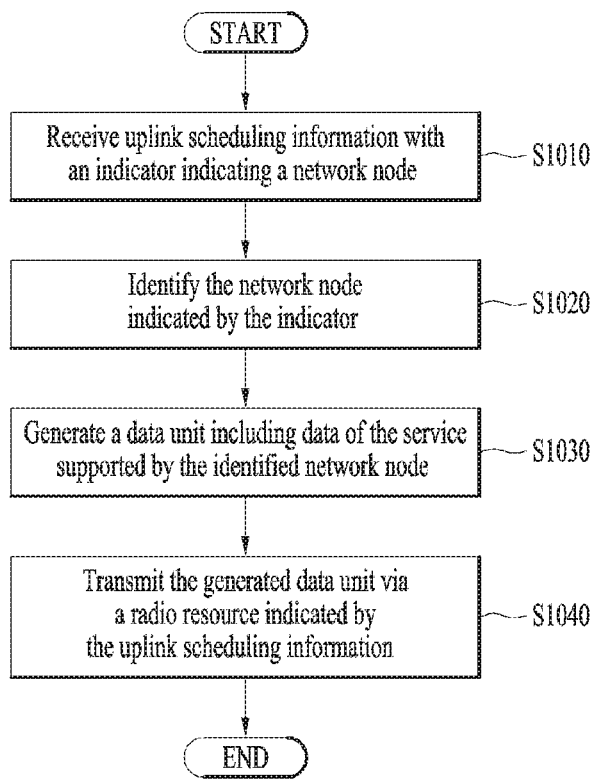
FIG. 10 is a flow chart illustrating a user equipment transmitting data according to an embodiment of the present invention.

FIG. 10 is a flow chart illustrating a user equipment transmitting data according to an embodiment of the present invention.

Referring to FIG. 10, the UE may receive uplink scheduling information with an indicator indicating a network node associated with the uplink scheduling information from a network node (S1010). For example, the indicator may be included in the uplink scheduling information itself (e.g., UL grant), or in the control signal for the uplink scheduling information (e.g., PDCCH, DCI format). In addition, the uplink scheduling information may further include a radio resource information (e.g., time, frequency, modulation, coding scheme.).

Subsequently, the UE may identify the network node indicated by the indicator (S1020). In addition, the UE may check the services associated with the network node indicated by the indicator. At this, the network node may support at least one service. For example, the network node may support at least one of voice/message services, streaming/video services, or game services. When network slicing is applied, the network node may be identified based on the service supported by the network node. In other words, the services supported by each network node may be different. In this case, the network node indicator may correspond to the service indicator.

Then, the UE may generate a data unit including data of the at least one service supported by the network node indicated by the indicator (S1030). For this, LCP procedure may be performed per service supported by the network node. Also, the UE may include a service identifier of the services of which data are included or an UE identifier in the data unit. After generating the data unit, the UE may transmit the generated data unit via a radio resource indicated by the uplink scheduling information to the network node (S1040).

As another example, the UE may be connected to multiple network nodes. The multiple network nodes may not use different radio resources exclusively and each of network nodes may support at least one service. For example, the network node may support at least one of voice/message services, streaming/video services, or game services. When the UE is connected with the multiple network nodes, the UE may be identified at the multiple network nodes via the same UE identifier (e.g., the same C-RNTI). In addition, the UE may know the services supported by each of the multiple network nodes.

As a specific example, the UE may be connected to two network nodes, e.g., network node 1 and network node 2. At this, the network node 1 is associated with Service 1 and 2 and network node 2 is associated with Service 3, 4, and 5. The network node 2 sends a uplink scheduling information to the UE by including indicator of network node 2 and the radio resource information. If the UE successfully receives the uplink scheduling information including indicator of network node 2 and the radio resource information, the UE may generate a data unit by including data from Service 3, 4, and 5 which is associated with network node 2. In addition, the UE may further include at least one of the Service identifier in the data unit or UE identifier in the data unit. Then, the UE may transmit the generated data unit via the radio resource indicated by the uplink scheduling information received from network node 2.

Figure 11:
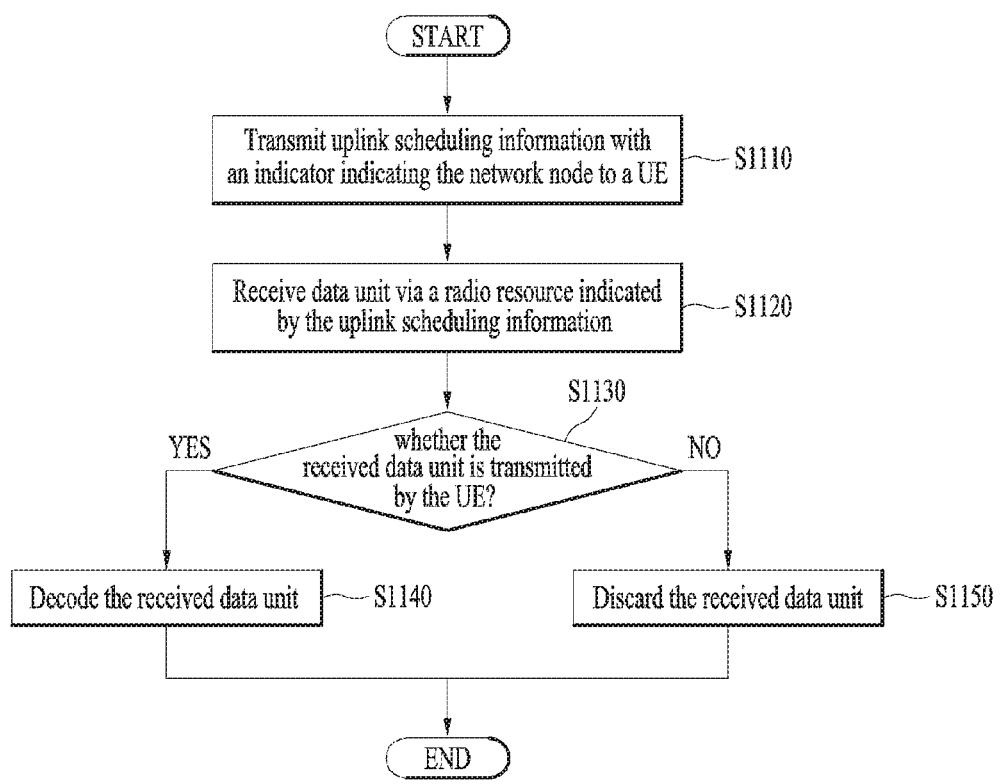
FIG. 11 is a flow chart illustrating a network node receiving data according to an embodiment of the present invention.

FIG. 11 is a flow chart illustrating a network node receiving data according to an embodiment of the present invention.

Referring to FIG. 11, the network node may transmit uplink scheduling information with an indicator indicating the network node associated with the uplink scheduling information to a UE (S1110). For example, the indicator may be included in the uplink scheduling information itself (e.g., UL grant), or in the control signal for the uplink scheduling information (e.g., PDCCH, DCI format). In addition, the uplink scheduling information may further include a radio resource information (e.g., time, frequency, modulation, coding scheme.). And, the network node may receive data unit via a radio resource indicated by the uplink scheduling information (S1120). The data unit may include a service identifier of the services of which data are included or an UE identifier.

Subsequently, the network node may check whether the received data unit is transmitted by the UE (S1130). As a result, if the network node considers that the received data unit is transmitted by the UE, the network node may perform decoding procedure for the received data unit (S1140). On the other hand, if the network node considers that the received data unit is not transmitted by the UE, the network node may discard the received data unit (S1150). In addition, if the received data unit is not for a service supported by the network node, the network node may discard the received data unit.

As a specific example, the UE may be connected to two network nodes, e.g., network node 1 and network node 2. At this the network node 1 is associated with Service 1 and 2 and network node 2 is associated with Service 3, 4, and 5. The network node 2 sends a uplink scheduling information to the UE by including indicator of network node 2 and the radio resource information. Then, the network node 2 may receive a data unit in response to the uplink scheduling information. When network node 2 receives the data unit on the radio resource allocated to the UE, the network node 2 checks whether the data unit is transmitted by the UE based on e.g., Service identifier or UE identifier included in the data unit. Thereafter, if the network node 2 considers that the data unit is transmitted by the UE to which the network node 2 allocates the radio resource, the network node 2 may start decoding procedure for the received data unit. However, if the network node 2 considers that the data unit is not transmitted by the UE to which the network node 2 allocates the radio resource, the network node 2 may ignore and/or discard the received data unit and may further send the uplink scheduling information to the UE.

Figure 12:
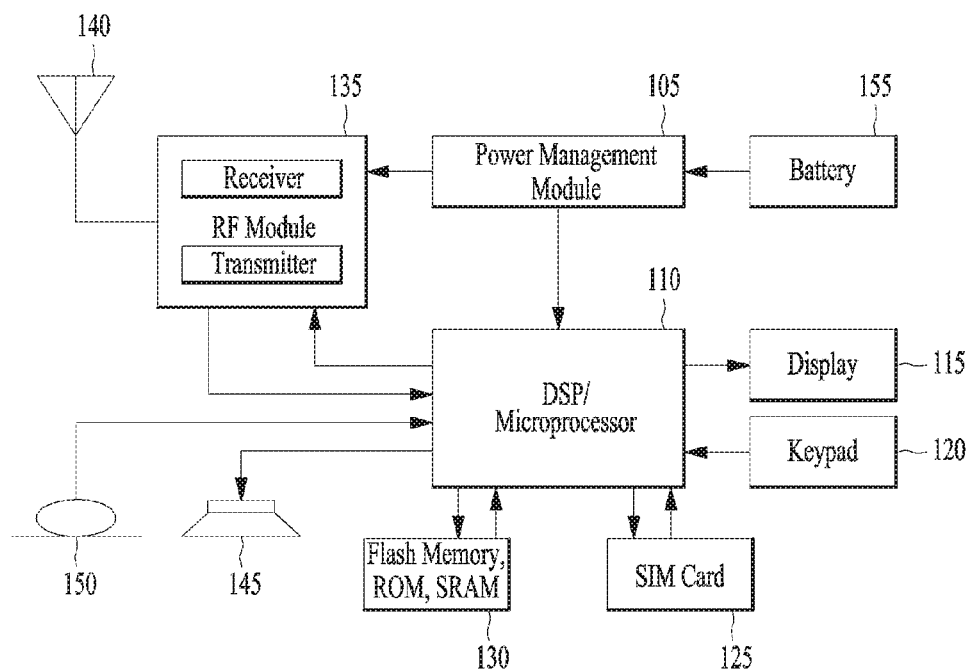
FIG. 12 is a block diagram of a communication apparatus according to an embodiment of the present invention.

FIG. 12 is a block diagram of a communication apparatus according to an embodiment of the present invention.

The apparatus shown in FIG. 12 can be a user equipment (UE) and/or eNB adapted to perform the above mechanism, but it can be any apparatus for performing the same operation.

As shown in FIG. 12, the apparatus may comprise a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 12 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 12 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. The processor (110) is configured to perform operations according to the embodiment of the present invention exemplarily described with reference to the accompanying drawings. In particular, the detailed operations of the processor (110) can refer to the contents described with reference to FIGS. 1 to 11.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

What is claimed is:

1. A method for a user equipment (UE) operating in a wireless communication system, the method comprising:
   receiving, from a network node among at least two network nodes, uplink scheduling information with an indicator indicating the network node transmitting the uplink scheduling information, wherein the UE is connected to the at least two network nodes which do not use different radio resources exclusively, and each of the at least two network nodes supports different services relative to each other;
   identifying the network node indicated by the indicator;
   generating a data unit including data of at least one service supported by the identified network node; and
   transmitting, to the identified network node, the generated data unit via a radio resource based on the uplink scheduling information.

2. The method according to claim 1, wherein the UE is aware of the different services supported by the at least two network nodes.

3. The method according to claim 1, wherein the indicator is included in the uplink scheduling information itself, or in a control signal for the uplink scheduling information.

4. The method according to claim 1, wherein the data unit further includes service identifiers of the at least one service of which data are included in the data unit, or an UE identifier.

5. A method for a network node operating in a wireless communication system, the method comprising:
   transmitting, to a user equipment (UE), uplink scheduling information with an indicator indicating the network node transmitting the uplink scheduling information, wherein the UE is connected to another network node which does not use different radio resources exclusively relative to the network node, and the network node and the other network node support different services relative to each other;
   receiving a data unit via a radio resource based on the uplink scheduling information;
   checking whether the received data unit is transmitted by the UE;
   based on the received data unit being transmitted by the UE, performing decoding procedure for the received data unit; and
   based on the received data unit not being transmitted by the UE, discarding the received data unit.

6. A User Equipment (UE) for operating in a wireless communication system, the UE comprising:
   a Radio Frequency (RF) transceiver; and
   a processor operably coupled with the RF transceiver,
   wherein the processor is configured to:
   control the RF transceiver to receive, from a network node among at least two network nodes, uplink scheduling information with an indicator indicating the network node transmitting the uplink scheduling information, wherein the UE is connected to the at least two network nodes which do not use different radio resources exclusively, and each of the at least two network nodes supports different services relative to each other,
   identify the network node indicated by the indicator,
   generate a data unit including data of the at least one service supported by the identified network node, and
   control the RF module to transmit, to the identified network node, the generated data unit via a radio resource based on the uplink scheduling information.

7. The UE according to claim 6, wherein the UE is aware of the different services supported by the at least two network nodes.

8. The UE according to claim 6, wherein the indicator is included in the uplink scheduling information itself, or in a control signal for the uplink scheduling information.

9. The UE according to claim 6, wherein the data unit further includes service identifiers of the at least one service of which data are included in the data unit, or an UE identifier.

* * * * *